United States Patent
Okuda et al.

(10) Patent No.: US 9,490,477 B2
(45) Date of Patent: Nov. 8, 2016

(54) NICKEL-METAL HYDRIDE STORAGE BATTERY INCLUDING NEGATIVE ELECTRODE CONTAINING YTTRIUM SUBSTITUTED HYDROGEN STORAGE ALLOY AND ELECTROLYTE SOLUTION CONTAINING SODIUM HYDROXIDE

(71) Applicant: GS Yuasa International Ltd., Kyoto-shi, Kyoto (JP)

(72) Inventors: Daisuke Okuda, Kyoto (JP); Manabu Kanemoto, Kyoto (JP); Tadashi Kakeya, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 108 days.

(21) Appl. No.: 14/036,228

(22) Filed: Sep. 25, 2013

(65) Prior Publication Data

US 2014/0087253 A1 Mar. 27, 2014

(30) Foreign Application Priority Data

Sep. 27, 2012 (JP) ................................. 2012-214202

(51) Int. Cl.
*H01M 4/38* (2006.01)
*H01M 10/26* (2006.01)
*C22C 19/00* (2006.01)
*H01M 10/34* (2006.01)

(52) U.S. Cl.
CPC .............. *H01M 4/383* (2013.01); *C22C 19/00* (2013.01); *H01M 4/385* (2013.01); *H01M 10/345* (2013.01); *H01M 2300/0014* (2013.01); *Y02E 60/124* (2013.01)

(58) Field of Classification Search
CPC .......................... H01M 4/383; H01M 4/385
USPC ..................................................... 429/218.2
See application file for complete search history.

(56) References Cited

U.S. PATENT DOCUMENTS

| | | | | |
|---|---|---|---|---|
| 5,512,385 | A * | 4/1996 | Komori | H01M 4/383 420/455 |
| 5,817,222 | A | 10/1998 | Kaneko | |
| 5,840,166 | A | 11/1998 | Kaneko | |
| 5,965,295 | A | 10/1999 | Bando et al. | |
| 5,985,054 | A | 11/1999 | Tanibuchi et al. | |
| 6,053,995 | A | 4/2000 | Tanibuchi et al. | |
| 6,261,517 | B1 * | 7/2001 | Kaneko | H01M 4/242 148/555 |
| 2004/0217327 | A1 | 11/2004 | Takamaru et al. | |
| 2009/0239144 | A1 | 9/2009 | Izumi et al. | |
| 2010/0178561 | A1 * | 7/2010 | Kakeya et al. | 429/218.2 |
| 2013/0213532 | A1 | 8/2013 | Kanemoto et al. | |

FOREIGN PATENT DOCUMENTS

| | | |
|---|---|---|
| EP | 1100141 | 5/2001 |
| EP | 2628812 | 8/2013 |
| JP | 7-286225 | 10/1995 |
| JP | 9-139230 | 5/1997 |
| JP | 09-213363 | 8/1997 |
| JP | 2001-143745 | 5/2001 |
| JP | 2001-279354 | 10/2001 |
| JP | 2002-367608 | 12/2002 |
| JP | 2004-124132 | 4/2004 |
| JP | 3688716 | 6/2005 |
| JP | 3737163 | 1/2006 |
| JP | 3869003 | 1/2007 |
| JP | 2007-149646 | 6/2007 |
| JP | 2008-258121 | 10/2008 |
| JP | 2009-272091 | 11/2009 |
| JP | 2011-127185 | 6/2011 |
| WO | 96/14442 | 5/1996 |

OTHER PUBLICATIONS

Kanemoto et al., Machine translation of JP 2009-272091 A, Nov. 2009.*
Li et al., "Effects of Y Substitution for La on the Microstructure and Electrochemical Properties of LaNi3.55Mn0.4Al0.3Co0.75 Hydrogen Storage Alloys," Materials Transactions, vol. 49, 2008, pp. 2229-2232.
Du et al., "Structural and electrochemical properties of annealed La1-xYxNi3.55Mn0.4Al0.3Co0.75 hydrogen storage alloys," Journal of Environmental Sciences, vol. 23, 2011, S59-S62.
Baddour-Hadjean et al., "An electrochemical study of new La1-xCexY2Ni9(0<x<1) hydrogen storage alloys," Electrochimica Acta, vol. 46, Issue 15, 2001, pp. 2385-2393.
Arnaud et al., "Effect of Yttria Content on Corrosion of AB5-Type Alloys for Nickel-Metal Hydride Batteries," Journal of the Electrochemical Society, vol. 152, Issue 3, 2005, A611-A616.
Peng et al., "Microstructures and Electrochemical Hydrogen Storage Characteristics of La0.65-xCe0.25-xPr0.03Nd0.07Y2xNi3.65Co0.75Mn0.3Al0.3 (x = 0-0.04) Alloys," International Journal of Electrochemical Science, vol. 8, 2013, pp. 2262-2271.
Extended European Search Report dated Dec. 18, 2013 filed in corresponding European patent application No. 13186194.0.

* cited by examiner

*Primary Examiner* — Sean P Cullen
(74) *Attorney, Agent, or Firm* — Rankin, Hill & Clark LLP

(57) ABSTRACT

A nickel-metal hydride storage battery includes a negative electrode containing a hydrogen storage alloy and an electrolyte solution. The hydrogen storage alloy has a CaCu5-type crystal structure and contains at least a Ni element and a rare earth element. The rare earth element is partly substituted with an Y element, and the electrolyte solution contains NaOH in an amount of 2.0 M or more.

5 Claims, 1 Drawing Sheet

NICKEL-METAL HYDRIDE STORAGE BATTERY INCLUDING NEGATIVE ELECTRODE CONTAINING YTTRIUM SUBSTITUTED HYDROGEN STORAGE ALLOY AND ELECTROLYTE SOLUTION CONTAINING SODIUM HYDROXIDE

CROSS-REFERENCE TO RELATED APPLICATION

This application is based on Japanese Patent Applications No. 2012-214202 filed with the Japan Patent Office on Sep. 27, 2012, the entire contents of which are hereby incorporated by reference.

FIELD

The present invention relates to a nickel-metal hydride storage battery.

BACKGROUND

Nickel-metal hydride storage (rechargeable) batteries are widely used as power sources of microelectronic equipment such as digital cameras and laptops because of their high energy density, and used as alternative power sources to primary batteries such as alkaline manganese batteries because the nickel-metal hydride storage batteries are equal in the operating voltage to the primary batteries and are compatible with the primary batteries. Therefore, demands for the nickel-metal hydride storage battery are steadily expanding.

Such a nickel-metal hydride storage battery uses a hydrogen storage alloy as a negative active material. An $AB_5$-type rare earth-Ni-based alloy having a $CaCu_5$-type crystal structure has been put to practical use as a hydrogen storage alloy. $MmNi_5$ is known as a typical example thereof.

However, the battery using the $MmNi_5$-based alloy has a problem that the preservation property is not sufficient. The preservation property can be improved by using an electrolyte solution containing a large amount of NaOH. However, since the electrolyte solution containing a large amount of NaOH tends to corrode the hydrogen storage alloy compared with a commonly used electrolyte solution containing KOH as a main ingredient, there is a problem that the battery life is shortened (JP-A-9-139230).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to provide a nickel-metal hydride storage battery having a long life in an electrolyte solution containing a large amount of NaOH.

The present inventor made earnest investigations, and consequently found that a hydrogen storage alloy having Y (yttrium) hardly causes corrosion even if an electrolyte solution containing a large amount of NaOH is used, and this finding has now led to completion of the present invention.

A nickel-metal hydride storage battery according to an aspect of the present invention includes a negative electrode containing a hydrogen storage alloy and an electrolyte solution. The hydrogen storage alloy has a $CaCu_5$-type crystal structure and contains at least a Ni element and a rare earth element. The rare earth element is partly substituted with an Y element. The electrolyte solution contains NaOH in an amount of 2.0 M or more.

BRIEF DESCRIPTION OF THE DRAWINGS

The foregoing and other features of the invention will become apparent to one skilled in the art to which the present invention relates upon consideration of the invention with reference to the accompanying drawings, wherein.

DESCRIPTION OF EMBODIMENTS

Figure 1:
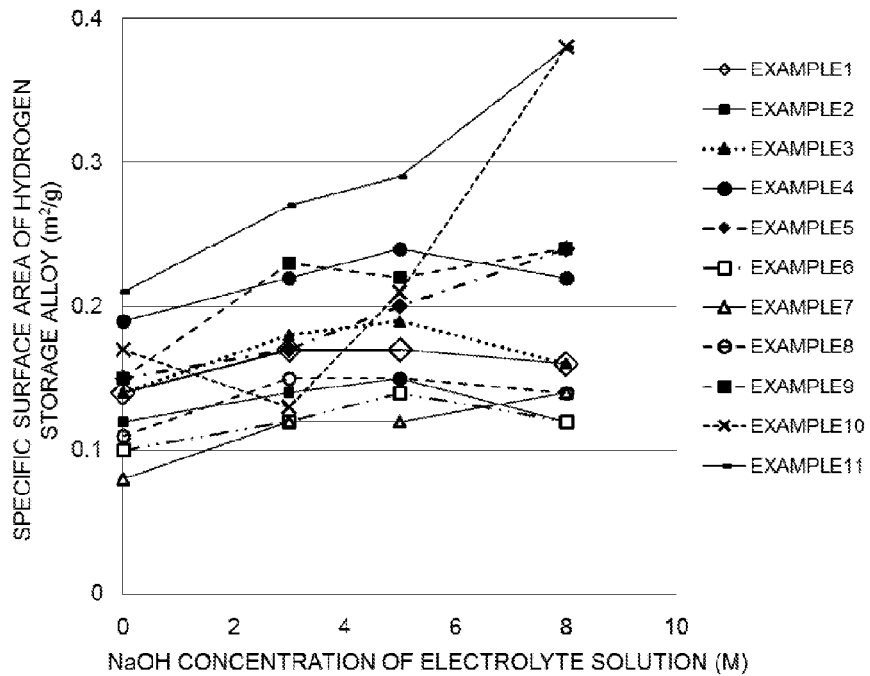
FIG. 1 is a graph showing a relationship between the NaOH concentration of an electrolyte solution and the specific surface area of hydrogen storage alloys (examples)

Hereinafter, embodiments of a nickel-metal hydride storage (rechargeable) battery according to the present invention will be described.

The nickel-metal hydride storage battery according to a first aspect of the present invention includes, for example, a negative electrode containing a hydrogen storage alloy as a negative active material, a positive electrode (nickel electrode) containing a positive active material containing nickel hydroxide as a main ingredient, a separator, and an electrolyte solution.

In the first aspect of the present invention, the hydrogen storage alloy has a $CaCu_5$-type crystal structure and contains at least a Ni element and a rare earth element, which is partly substituted with an Y element, and the electrolyte solution contains NaOH in an amount of 2.0 M or more. The corrosion of the hydrogen storage alloy in an electrolyte solution containing a large amount of NaOH can be suppressed since the hydrogen storage alloy contains Y. The reason for this is probably that a protective film of yttrium hydroxide formed on the surface of the alloy by the reaction of Y in the alloy with an electrolyte solution suppresses corrosion of the alloy due to NaOH.

In a second aspect of the present invention, the hydrogen storage alloy includes a Ce element.

In the third aspect of the present invention, the content of elements other than the rare earth element in the hydrogen storage alloy is 5.2 times or more than that of the rare earth element in terms of the number of atoms.

In the fourth aspect of the present invention, the electrolyte solution includes NaOH in an amount of 6.0 M or more and 8.0 M or less.

In the fifth aspect of the present invention, the hydrogen storage alloy contains at least one metal element selected from a group consisting of a Co element, a Mn element, and an Al element.

In the sixth aspect of the present invention, the hydrogen storage alloy contains a Co element and the content of the Co element is 0.4 times or less than that of the rare earth element in terms of the number of atoms.

The hydrogen storage alloy preferably contains a Ce element. The corrosion of the hydrogen storage alloy in an electrolyte solution containing a large amount of NaOH can be remarkably suppressed by such a configuration. The reason for this is probably that a protective film of a composite of yttrium hydroxide and cerium hydroxide is formed on the surface of the alloy by the reaction of Y and Ce in the alloy with an electrolyte solution and the protective film suppresses corrosion of the alloy due to NaOH.

The content of elements other than the rare-earth elements in the hydrogen storage alloy is preferably 5.1 times or more, and more preferably 5.2 times or more than that of the rare-earth elements in terms of the number of atoms. When the content is less than 5.1 times, durability of the alloy is lowered, and when the content is 5.2 times or more, sufficient alloy durability is achieved.

The upper limit of the content of elements other than the rare-earth elements in the hydrogen storage alloy is not particularly limited, but it is preferably 5.4 times or less than that of the rare-earth elements in terms of the number of atoms. The upper limit of the content is more preferably 5.3 times or less. When the upper limit of the content is more than 5.4 times, the $CaCu_5$-type crystal structure may not be formed, and the hydrogen storage capability may be lost. Further, with respect to the contents of the respective elements in the alloy when the total of the contents tin terms of the number of atoms) of the rare-earth elements is taken as 1, preferably, the content of a La element is 0.5 to 0.9, the content of a Y element is 0.05 to 0.4, and the content of a Ce element is 0.05 to 0.3. When the content of the Y element is 0.05 or more, the effect of improving corrosion resistance is achieved, and when the content of the Y element is more than 0.4, yttrium is segregated and alloy durability is deteriorated. When the content of the Ce element is 0.05 or more, the effect of improving corrosion resistance is achieved, and when the content of the Ce element is more than 0.3, alloy durability is deteriorated. The content of the Ni element is preferably 4.35 to 4.55 times that of the rare-earth elements in terms of the number of atoms, and the content of elements other than the rare-earth elements and the Ni element in the hydrogen storage alloy is preferably 0.85 to 0.95 times that of the rare-earth elements in terms of the number of atoms. When the content of elements other than the rare-earth elements and the Ni element is more than 0.95 times, preservation property is lowered due to fine short-circuiting, and when the content is less than 0.85 times, durability of the alloy is lowered.

Examples of the elements other than the rare-earth elements and the Ni element in the hydrogen storage alloy include Co, Mn, Al, Fe, Cu, Cr, and Zn. Among these elements, Co, Mn and Al are preferable, and Co is particularly suitably used. A Ni—Co alloy layer having high corrosion resistance is formed on the alloy surface due to Co contained in the alloy composition. Since the Ni—Co alloy layer has higher corrosion resistance than a low-density layer of Ni alone, which is formed on an alloy not containing Co, the alloy containing Co has higher corrosion resistance than the alloy not containing Co in an electrolyte solution. The content of the Co element is preferably 0.4 times or less than that of the rare-earth elements in terms of the number of atoms.

In the hydrogen storage alloy, Co is more preferably used in combination with Mn and Al. An example of the preferred hydrogen storage alloy in the case of combined use of Co, Mn and Al is a hydrogen storage alloy represented by the general formula $La_{(1-x-y)}Y_xCe_yNi_aCo_cMn_{b1}Al_{b2}$, wherein c, b1 and b2 preferably satisfy the relations of $0.01 \leq c \leq 0.4$, $0.1 \leq b1 \leq 0.4$ and $0.35 \leq b2 \leq 0.45$.

In addition, the hydrogen storage alloy may contain an element not defined by the general formula as inevitable impurities in addition to the alloy represented by the general formula.

A method of manufacturing the hydrogen storage alloy is not particularly limited, and examples thereof include a melt spinning method, an arc melting method, a casting method, and a gas atomizing method. The hydrogen storage alloy can be manufactured by selecting an appropriate method from these.

The hydrogen storage alloy is compounded in a negative electrode in the form of a hydrogen storage alloy powder, for example. The average particle size of the hydrogen storage alloy powder is preferably 20 to 100 μm, and more preferably 40 to 70 μm. When the average particle size is less than 20 μm, activation of the alloy is insufficient, and on the other hand, when the average particle diameter is more than 100 μm, the productivity may be lowered. The hydrogen storage alloy powder is obtained by crushing the hydrogen storage alloy with a machine in the presence of an inert gas, for example.

The negative electrode may contain a conductive agent, a binder (including a thickener) and the like in addition to the hydrogen storage alloy.

Examples of the conductive agent include carbon-based conductive agents such as natural graphite (scaly graphite, flake graphite, amorphous graphite, etc.), synthetic graphite, carbon black, acetylene black, Ketjen black, carbon whisker, carbon fiber, and vapor-grown carbon; and metallic conductive agents made of a powder or fiber of metals such as nickel, cobalt, and copper. These conductive agents may be used alone or in combination of two or more species. The negative electrode may also contain a rare-earth oxide such as yttrium oxide as an anticorrosive.

The compounded amount of the conductive agent is preferably 0.1 to 10 parts by mass, and more preferably 0.2 to 5 parts by mass with respect to 100 parts by mass of the hydrogen storage alloy. When the compounded amount of the conductive agent is less than 0.1 part by mass, it is hard to obtain sufficient conductivity. On the other hand, when the compounded amount of the conductive agent is more than 10 parts by mass, the effect of improving the discharge capacity may be insufficient.

Examples of the binder include polytetrafluoroethylene (PTFE), polyolefin-based resins such as polyethylene and polypropylene, ethylene-propylene-diene terpolymer (EPDM), sulfonated EPDM, styrene-butadiene rubber (SBR), fluorine-contained rubber, polyvinyl alcohol, methylcellulose, carboxymethylcellulose, and xanthan gum. These binders may be used alone or in combination of two or more species.

The compounded amount of the binder is preferably 0.1 to 1.0 part by mass, and more preferably 0.5 to 1.0 part by mass with respect to 100 parts by mass of the hydrogen storage alloy powder. When the compounded amount of the binder is less than 0.1 part by mass, an adequate thickening property is hardly achieved. On the other hand, when the compounded amount of the binder is more than 1.0 part by mass, electrode performance may be insufficient.

Examples of the positive electrode include electrodes in which a nickel hydroxide composite oxide, formed by mixing nickel hydroxide as a main ingredient with zinc hydroxide or cobalt hydroxide, is compounded as a positive active material. As the nickel hydroxide composite oxide, a composite oxide uniformly dispersed by a coprecipitation method is suitably used.

The positive electrode preferably contains an additive for improving electrode performance in addition to the nickel hydroxide composite oxide. Examples of the additive include conduction modifiers such as cobalt hydroxide and cobalt oxide, and the nickel hydroxide composite oxide coated with cobalt hydroxide. Alternatively, the nickel hydroxide composite oxide, a part of which is oxidized by oxygen or oxygen-containing gas, $K_2S_2O_8$, hypochlorous acid, or the like, may also be used.

As the additive, compounds containing rare-earth elements such as Y and Yb, or compounds that increase the overvoltage of oxygen generation such as Ca compounds can also be used. The rare-earth elements such as Y and Yb can also be expected to be effective for suppressing the corrosion of the negative active material since a part of the rare-earth elements is dissolved in an electrolyte solution and deposited on the surface of the negative electrode.

The positive electrode may further contain the conductive agent and the binder described above, similarly to the negative electrode.

These positive electrode and negative electrode can each be manufactured by the following procedures. The conductive agent and the binder described above are added to the active material as required. The resulting mixture is kneaded with water or an organic solvent such as alcohol or toluene to obtain a paste. The paste is applied to a conductive support and dried, and then subjected to roll forming, for example.

Examples of the conductive support include steel sheets and plated steel sheets obtained by plating a steel sheet with a metal material such as nickel. Examples of shape of the conductive support include three-dimensional substrates such as a foam, a shaped body of fibers, and a substrate subjected to pebbling; and two-dimensional substrates such as a punched plate. Among these conductive supports, as the support for the positive electrode, a foam which is made of nickel having excellent corrosion resistance to alkalis and oxidation resistance and has a porous structure, a structure having excellent current collecting performance, is preferable. On the other hand, as the conductive support for the negative electrode, a perforated steel sheet, that is formed by nickel-plating an iron foil which is inexpensive and excellent in conductivity, is preferable.

The thickness of the conductive support is preferably 30 to 100 μm, and more preferably 40 to 70 μm. When the thickness of the conductive support is less than 30 μm, the productivity may be lowered. On the other hand, when the thickness of the conductive support is more than 100 μm, the discharge capacity may be insufficient.

When the conductive support is a perforated steel sheet, the inner diameter of the hole is preferably 0.8 to 2 μm, and more preferably 1 to 1.5 μm. When the inner diameter of the hole is less than 0.8 μm, the productivity may be lowered. On the other hand, when the inner diameter is more than 2 μM, the performance of retaining the hydrogen storage alloy may be insufficient.

Examples of a method of applying a paste for electrodes to the conductive support include a roller coating method using an applicator roll, a screen coating method, a blade coating method, a spin coating method, and a bar coating method.

Examples of the separator include porous membranes or non-woven cloths made of a polyolefin-based resin such as polyethylene or polypropylene, acrylic, polyamide or the like.

The weight per unit area of the separator is preferably 40 to 100 g/m². When the weight per unit area is less than 40 g/m², a short circuit or deterioration in self discharge performance may occur. On the other hand, when the weight per unit area is more than 100 g/m², since the proportion of the separator per unit volume is increased, the battery capacity tends to decrease. Further, the air permeability of the separator is preferably 1 to 50 cm/sec. When the air permeability is less than 1 cm/sec, the battery internal pressure may become too high. On the other hand, when the air permeability is more than 50 cm/sec, a short circuit or deterioration in self discharge performance may occur. Moreover, the average fiber diameter of the separator is preferably 1 to 20 μm. When the average fiber diameter is less than 1 μm, the strength of the separator may be lowered, resulting in an increase in the percent defective in a battery-assembling step. On the other hand, when the average fiber diameter is more than 20 μm, a short circuit or deterioration in self discharge performance may occur.

The fiber surface of the separator is preferably subjected to hydrophilization treatment. Examples of the hydrophilization treatment include sulfonation treatment, corona treatment, fluorine gas treatment, and plasma treatment. Particularly, a separator with fiber surfaces subjected to sulfonation treatment has a high effect of suppressing self discharge and is preferred since it has a high ability of adsorbing impurities such as $NO_3^-$, $NO_2^-$ and $NH_3^-$ which cause a shuttle phenomenon, and an element eluted from the negative electrode.

The electrolyte solution used in the present embodiment contains NaOH (sodium hydroxide) in an amount of 2.0 M or more, and preferably in an amount of 6.0 M or more. The unit M (molar) represents the unit mol/L. It is possible to improve the preservation property of a battery and prevent corrosion of the hydrogen storage alloy simultaneously by applying the electrolyte solution to the hydrogen storage alloy, and consequently the battery life can be lengthened.

An alkaline electrolyte contained in the electrolyte solution may be NaOH alone, but KOH (potassium hydroxide) or LiOH (lithium hydroxide) may be used in combination with NaOH.

With respect to the concentration of the electrolyte solution, the total of ion concentrations is preferably 8.0 M or less, and more preferably 5.0 to 8.0 M. Further, it is preferred that NaOH is used in combination with KOH so as to give such an ion concentration.

Various additives may be added to the electrolyte solution in order to improve the overvoltage of oxygen generation at the positive electrode, corrosion resistance at the negative electrode, and self-discharge resistance. Examples of such additives include oxides and hydroxides of yttrium, ytterbium, erbium, calcium, and zinc. These additives may be used alone or in combination of two or more species.

When the nickel-metal hydride storage battery of the present embodiment is an open type nickel-metal hydride storage battery, the battery can be manufactured, for example, by a method of sandwiching a negative electrode between positive electrodes with a separator interposed between the negative electrode and each of the positive electrodes, pouring an electrolyte solution in a state where the electrodes are fixed so that a predetermined pressure is applied to these electrodes, and assembling an open type cell.

On the other hand, when the nickel-metal hydride storage battery of the present embodiment is a sealed nickel-metal hydride storage battery, the battery can be manufactured by a method of pouring an electrolyte solution before or after stacking a positive electrode, a separator and a negative electrode, and sealing the battery with a casing material.

Further, in the sealed nickel-metal hydride storage battery prepared by winding a power generating element formed by stacking the positive electrode and the negative electrode with the separator interposed therebetween, it is preferred that the electrolyte solution is poured into the battery case before or after winding the power generating element. The method of pouring the electrolyte solution is not particularly limited, and the electrolyte solution may be poured at a normal pressure. The electrolyte solution may be poured by using a vacuum impregnation method, a pressure impregnation method or a centrifugal impregnation method. Examples of the battery case and the casing material of the sealed nickel-metal hydride storage battery include materials made of iron, iron plated with a metal material such as nickel, stainless steel and a polyolefin-based resin.

The type of the sealed nickel-metal hydride storage battery is not particularly limited, and examples thereof include batteries including a positive electrode, a negative electrode and a monolayer or multilayer separator, such as coin batteries, button batteries, prismatic batteries, and flat type batteries; and cylindrical batteries including a positive electrode, a negative electrode and a separator which are formed into a roll.

Examples

Hereinafter, the present embodiment will be described in more detail by way of examples, but the present invention is not limited to these examples.

In 60 mL of an electrolyte solution obtained by dissolving NaOH and KOH in such a way that the total concentration thereof was 8 M, 5 g of a hydrogen storage alloy in each of examples and comparative examples, the composition of which is shown in Table 1 described below, was immersed, and was left standing in a thermostat bath kept at 80° C. for 72 hours. The hydrogen storage alloys in comparative examples do not contain Y. Each of the alloys used was an alloy in which a large part of the crystal structure was a $CaCu_5$-type crystal structure, and which has a B/A ratio of 5.1 to 5.4. The B/A ratio is a ratio of elements other than the rare-earth elements to the rare-earth elements in the hydrogen storage alloy.

Figure 2:
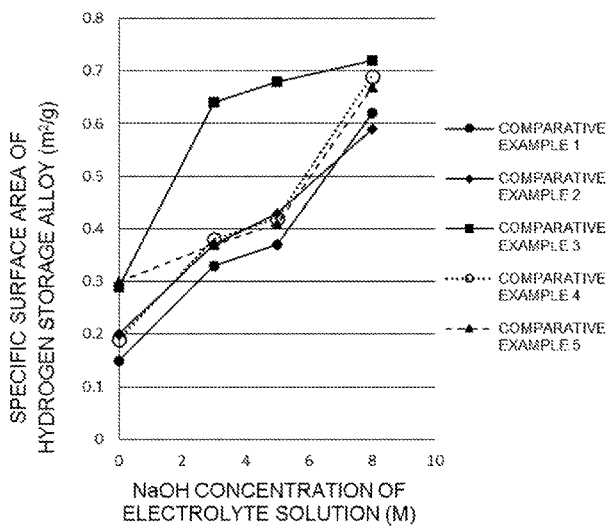
FIG. 2 is a graph showing a relationship between the NaOH concentration of an electrolyte solution and the specific surface area of hydrogen storage alloys (comparative examples).

After being left standing in the thermostat bath, each hydrogen storage alloy was isolated, washed and dried. The specific surface area of 2 g of the hydrogen storage alloy was measured by a BET method using a specific surface area measurement apparatus. The results of measurement are shown in Table 1 and graphs of FIGS. 1 and 2.

TABLE 1

| | | Alloy composition | B/A | Specific surface area in each electrolyte solution ($m^2/g$) | | | |
|---|---|---|---|---|---|---|---|
| | | | | 8M KOH | 3M NaOH + 5M KOH | 5M NaOH + 3M KOH | 8M NaOH |
| Example | 1 | $La_{0.8}Y_{0.1}Ce_{0.1}Ni_{4.45}Co_{0.2}Mn_{0.3}Al_{0.35}$ | 5.30 | 0.14 | 0.17 | 0.17 | 0.16 |
| | 2 | $La_{0.8}Y_{0.1}Ce_{0.1}Ni_{4.35}Co_{0.3}Mn_{0.3}Al_{0.35}$ | 5.30 | 0.12 | 0.14 | 0.15 | 0.12 |
| | 3 | $La_{0.8}Y_{0.1}Ce_{0.1}Ni_{4.45}Co_{0.1}Mn_{0.3}Al_{0.45}$ | 5.30 | 0.14 | 0.18 | 0.19 | 0.16 |
| | 4 | $La_{0.8}Y_{0.1}Ce_{0.1}Ni_{4.45}Co_{0.01}Mn_{0.4}Al_{0.45}$ | 5.31 | 0.19 | 0.22 | 0.24 | 0.22 |
| | 5 | $La_{0.85}Y_{0.05}Ce_{0.1}Ni_{4.45}Co_{0.01}Mn_{0.4}Al_{0.45}$ | 5.31 | 0.15 | 0.17 | 0.2 | 0.24 |
| | 6 | $La_{0.6}Y_{0.1}Ce_{0.3}Ni_{4.45}Co_{0.4}Mn_{0.1}Al_{0.35}$ | 5.30 | 0.1 | 0.12 | 0.14 | 0.12 |
| | 7 | $La_{0.6}Y_{0.3}Ce_{0.1}Ni_{4.45}Co_{0.2}Mn_{0.3}Al_{0.35}$ | 5.30 | 0.08 | 0.12 | 0.12 | 0.14 |
| | 8 | $La_{0.5}Y_{0.4}Ce_{0.1}Ni_{4.45}Co_{0.2}Mn_{0.3}Al_{0.35}$ | 5.30 | 0.11 | 0.15 | 0.15 | 0.14 |
| | 9 | $La_{0.8}Y_{0.1}Ce_{0.1}Ni_{4.55}Co_{0.2}Mn_{0.3}Al_{0.35}$ | 5.40 | 0.15 | 0.23 | 0.22 | 0.24 |
| | 10 | $La_{0.8}Y_{0.2}Ni_{4.45}Co_{0.2}Mn_{0.3}Al_{0.35}$ | 5.30 | 0.17 | 0.13 | 0.21 | 0.38 |
| | 11 | $La_{0.9}Y_{0.1}Ni_{4.25}Mn_{0.4}Al_{0.45}$ | 5.10 | 0.21 | 0.27 | 0.29 | 0.38 |
| Comparative Example | 1 | $La_{0.8}Sm_{0.1}Ce_{0.1}Ni_{4.45}Co_{0.2}Mn_{0.3}Al_{0.35}$ | 5.30 | 0.15 | 0.33 | 0.37 | 0.62 |
| | 2 | $La_{0.8}Pr_{0.1}Ce_{0.1}Ni_{4.45}Mn_{0.4}Al_{0.45}$ | 5.30 | 0.2 | 0.37 | 0.43 | 0.59 |
| | 3 | $La_{0.9}Ce_{0.1}Ni_{4.25}Mn_{0.4}Al_{0.45}$ | 5.10 | 0.29 | 0.64 | 0.68 | 0.72 |
| | 4 | $La_{0.8}Pr_{0.2}Ni_{4.35}Co_{0.2}Mn_{0.3}Al_{0.35}$ | 5.20 | 0.19 | 0.38 | 0.42 | 0.69 |
| | 5 | $La_{0.9}Pr_{0.1}Ni_{4.25}Mn_{0.4}Al_{0.45}$ | 5.10 | 0.3 | 0.37 | 0.41 | 0.67 |

Since the specific surface area shows a positive correlation with the corrosion, a larger specific surface area shows that the corrosion has progressed. Accordingly, it is found from the graph of FIG. 1 that a progress in corrosion due to NaOH was suppressed in examples. Particularly, in Examples 1 to 9 in which the hydrogen storage alloy contained both of Y and Ce, it is found that the corrosion did not progress in any hydrogen storage alloy. On the other hand, it is found that corrosion remarkably progressed with increases in the ratio of NaOH in any hydrogen storage alloy in comparative examples.

Since a nickel-metal hydride battery of the present embodiment has a constitution described above, it can provide a nickel-metal hydride storage battery having a long life in an electrolyte solution containing a large amount of NaOH.

What is claimed is:

1. A nickel-metal hydride storage battery comprising:
a negative electrode containing a hydrogen storage alloy represented by the formula $La_{(1-x-y)}Y_xCe_yNi_aCo_cMn_{b1}Al_{b2}$, $0.05 \leq x \leq 0.4$, $0.05 \leq y \leq 0.3$, $4.35 \leq a \leq 4.55$, $0.01 \leq c \leq 0.4$, $0.1 \leq b1 \leq 0.4$ and $0.35 \leq b2 \leq 0.45$; and
an electrolyte solution,
wherein the hydrogen storage alloy has a $CaCu_5$-type crystal structure,
wherein the electrolyte solution contains NaOH in an amount of 2.0 M or more, and
wherein the content of elements other than rare earth elements in the hydrogen storage alloy is 5.1 times or more than that of the rare earth elements in terms of the number of atoms.

2. The nickel-metal hydride storage battery according to claim claim 1, wherein the content of elements other than the rare earth elements in the hydrogen storage alloy is 5.2 times or more than that of the rare earth elements in terms of the number of atoms.

3. The nickel-metal hydride storage battery according to claim 1, wherein the content of elements other than the rare earth elements in the hydrogen storage alloy is 5.1 or more and 5.4 times or less than that of the rare earth elements in terms of the number of atoms.

4. The nickel-metal hydride storage battery according to claim 1, wherein the content of elements other than the rare earth elements in the hydrogen storage alloy is 5.2 times or more and 5.4 times or less than that of the rare earth elements in terms of the number of atoms.

5. The nickel-metal hydride storage battery according to claim 1, wherein the electrolyte solution contains NaOH in an amount of 6.0 M or more and 8.0 M or less.

* * * * *